United States Patent
Hall et al.

(10) Patent No.: US 7,019,421 B1
(45) Date of Patent: Mar. 28, 2006

(54) MODULAR LINEAR ELECTRIC MOTOR WITH LIMITED STATOR EXCITATION ZONE AND STATOR GAP COMPENSATION

(75) Inventors: David J. Hall, Pittsburgh, PA (US); Thomas A. Lemak, McKeesport, PA (US); Regis J. Hillenbrand, Murrysville, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 166 days.

(21) Appl. No.: 10/783,794

(22) Filed: Feb. 20, 2004

(51) Int. Cl.
*H02K 41/00* (2006.01)
(52) U.S. Cl. .................... 310/12; 187/251; 187/289
(58) Field of Classification Search ............... 187/250, 187/251, 289; 310/12–14
See application file for complete search history.

(56) References Cited

U.S. PATENT DOCUMENTS

| | | | |
|---|---|---|---|
| 1,931,997 A | 10/1933 | Schmidt | 189/249 |
| 2,408,759 A | 10/1946 | Dunlop | 414/137.2 |
| 3,896,736 A | 7/1975 | Hamy | 104/127 |
| 4,849,664 A * | 7/1989 | Miyazaki et al. | 310/12 |
| 5,158,156 A | 10/1992 | Okuma et al. | 187/251 |
| 5,183,980 A | 2/1993 | Okuma et al. | 187/289 |
| 5,203,432 A | 4/1993 | Grinaski | 187/251 |
| 5,234,079 A | 8/1993 | Nomura | 187/250 |
| 5,235,144 A | 8/1993 | Matsui et al. | 187/250 |
| 5,288,956 A | 2/1994 | Kadokura et al. | 187/289 |
| 5,751,076 A | 5/1998 | Zhou | 310/12 |
| 5,831,353 A | 11/1998 | Bolding et al. | 310/12 |
| 5,949,036 A | 9/1999 | Kowalczyk et al. | 187/316 |
| 6,189,657 B1 | 2/2001 | Jessenberger | 187/289 |
| 6,305,501 B1 | 10/2001 | Kahkipuro et al. | 187/289 |
| 2002/0197174 A1 | 12/2002 | Howard | 414/417 |

OTHER PUBLICATIONS

Nasar, S.A., et al., "Linear Motion Electric Machines", John Wiley and Sons, New York, NY, 1976, pp. 40-41.

* cited by examiner

*Primary Examiner*—Darren Schuberg
*Assistant Examiner*—Judson H. Jones
(74) *Attorney, Agent, or Firm*—Reed Smith LLP (57) ABSTRACT

A linear motor system including compartmentalized stator sections provides an interchangeable and serviceable alternative to other linear motors. The stator sections may be individually-energized so that power is only sent to stator sections adjacent to the thrust plate or rotor of the linear motor. A sufficiently long thrust plate is used to cover any gaps in the linear stator, and additional compensation stator sections are used to provide additional motor force to the thrust plate adjacent to these gap sections. If utilized onboard a ship, additional compensation stator sections may be incorporated into the face of deck hatches. The linear motor system can also be used to counteract gravitational effects in a large hanging door system implementation.

20 Claims, 7 Drawing Sheets

TOP VIEW

MODULAR LINEAR ELECTRIC MOTOR WITH LIMITED STATOR EXCITATION ZONE AND STATOR GAP COMPENSATION

BACKGROUND OF THE INVENTION

1. Field of the Invention

The present invention relates generally to linear motor systems, and more specifically, the present invention relates to linear motor systems including sectioned stators with thrust compensation regions.

2. Description of the Background

Linear motors may be used in many diverse environments to move a thrust plate or runner along a path through a linear stator, often travelling great distances. Several useful applications of linear motors include elevator systems (with the motor oriented vertically), large door drive systems (oriented horizontally) and projectile launching systems (oriented horizontally).

For shipboard and other space-limited applications, it is desired to use linear motors as part of elevator systems. For example, an aircraft carrier may have ten or more elevators used to transfer weapons, crew and other materials between decks. Because linear motor-based elevators can be designed as open lifts (without cables), they are suitable for carrying such varied cargo and provide for easy ingress and egress onto and off of the elevator platform.

However, to prevent flooding or to contain other fluid/gas transfer (such as a deck level explosion), the elevator shafts in shipboard applications typically have hatches that seal the elevator shaft at one or more deck levels. In the event of an onboard emergency, these deck hatches may be closed to contain flooding or prevent contamination to other compartments or decks. As a safety precaution, during normal operation, these deck hatches remain closed unless and until an elevator requires passage through the sealed area of the elevator shaft. Obviously, having hatches that seal off the elevator shaft between decks precludes the use of conventional cabled elevators in these shafts.

Although linear motors may generally be useful in such areas, conventional linear motors are also not inherently suitable to use in these elevator shafts. Specifically, a linear motor operates by selectively energizing the coils of a linear stator such that a thrust plate (and everything attached to the thrust plate) moves along the stator. Gaps in the stator, however, disrupt or stop the movement of the thrust plate. Because the deck hatches must completely seal with all of the walls of the elevator shaft, gaps in the stator (attached to at least one wall of the elevator shaft) will necessarily occur at these hatch-sealing points, making the conventional linear motor elevator inoperable under these conditions.

As such, there exists a need in the art to provide linear motor elevator and horizontal movement systems that compensate for stator gaps and orientation difficulties that may occur in shipboard applications. The present invention, in at least one preferred embodiment, addresses one or more of the above-described and other limitations to prior art systems.

SUMMARY OF THE INVENTION

In accordance with at least one preferred embodiment, the present invention provides a linear motor system adapted for use wherein gaps exist in the stator. The stator is designed in compartmentalized sections that may be separately energized, and multiple stator sections may then be grouped and installed as a single stator module. Aligning a plurality of these stator modules adjacent to each other (end-to-end) provides a close approximation to a conventional continuous linear stator.

At any "gap" regions along the length of the linear stator, for example at locations at which hatches are used to seal the elevator shaft when not in use, one or more types of compensation stator sections are preferably used. As a first compensation stator section type, one or more additional stator modules (i.e., additional linear motors) may be incorporated in parallel with the existing stator modules to compensate for lost power over the gap. The thrust plate (rotor) of the linear motor must be of sufficient length to bridge the gap in the stator (and therefore be in contact with stator sections above and below the gap at the same time).

As a second compensation method for the ship hatch application, a stator module may be incorporated into the face of the deck hatch such that, upon opening, the hatch stator module is aligned with the other stator modules attached to the walls of the elevator shaft (see FIG. 6C). Only small gaps above and below the hatch stator module would remain (which could be compensated for by the first compensation device).

Finally, the concepts of the present invention may be incorporated into horizontal applications of linear motors. For example, for large hanging doors such as hangar bay doors, a linear motor could be used at the top of the door to at least partially compensate for the weight of the door against gravity. Reducing the weight of the door will reduce the occurrence of door fouling and may even reduce friction entirely.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 6 depicts a side view of an exemplary stator module orientation adjacent to a shipboard deck hatch with the hatch in the closed (6A), partially open (6B) and open (6C) positions;

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

As briefly described above, linear motors for shipboard weapons (and other) elevator applications must be designed to fit within the confines of the shaft walls. In addition, the linear motor components must not interfere with the necessary elevator guides and supports (see FIG. 7) also located within the space between the elevator platform and shaft wall. Although the concepts of the present invention will be shown and described as part of a shipboard elevator system, the concepts are more general in nature and can be applied to other linear motor systems with stator gaps and/or confined usage spaces.

Figure 1:
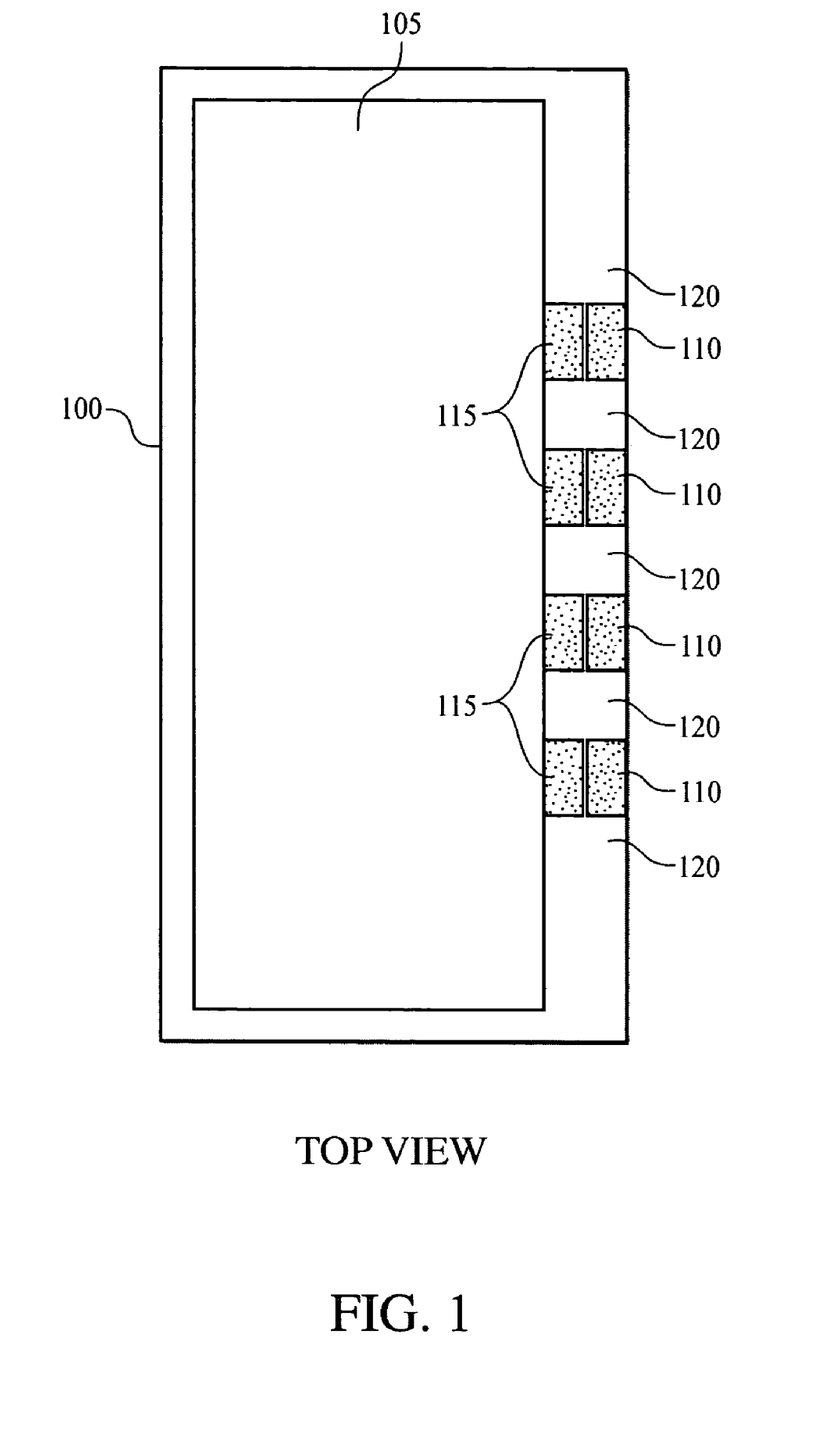
FIG. 1 depicts a top view of an elevator platform and shaft (looking down the shaft from above) with selected linear motor features.

FIG. 1 shows a top view looking down through an elevator shaft 100 including a vertical linear motor according to the present invention. The elevator shaft 100 is shown as being generally rectangular, and the elevator platform 105 is matched to the size of the elevator shaft 100. To enable vertical movement (into and out of the page), one or more linear stators 110 (as commonly known in the art) are oriented vertically in the shaft 100 generally parallel to each other. Four such linear stators 110 are shown in parallel with each other in FIG. 1. However, the size and number of stators 110 is based on the size of the elevator platform 105 and the mass of the cargo to be carried on the elevator platform 105.

One or more thrust plates 115 (i.e., linear rotors) are attached to one side of the elevator platform 105 and are oriented vertically (into and out of the page) to mate with the linear stators 110. By selectively energizing the stator coils 110 (as is known in the art), the platform 105 and the cargo onboard may be raised and lowered under power. Spaces 120 preferably exist between the parallel stators 110 to accommodate guide rails, supports and other structures (see FIG. 7) that may exist in the elevator shaft 100. FIG. 6 generally depicts a side view of the same platform (535), thrust plates (530) and linear stator modules (500), for reference.

For hatch clearance (see FIG. 6) and other reasons, gaps at certain locations in the linear stator may be necessary or preferred. For example, on aircraft carriers, the linear motor system must be capable of traversing gaps of 20 inches or more in the stationary stator components mounted on the elevator shaft wall to accommodate a typical deck hatch.

In order to reduce motor power consumption and to accommodate these gaps (described below), the linear motor design of the present invention includes a "short stator" design, with compartmentalized stator sections.

A short stator design utilizes switches to feed power only to individual stator sections adjacent to the thrust plate at a particularly moment in time. In other words, stator sections on decks well above and below the position of the elevator will not be energized. This design eliminates the very large excitation currents associated with single-sided stators which are not currently adjacent to the thrust plate. Power consumption and motor drive rating are further reduced by providing excitation with permanent magnets on the thrust plate and operating the motor as a synchronous machine, as is known in the art.

Figure 2:
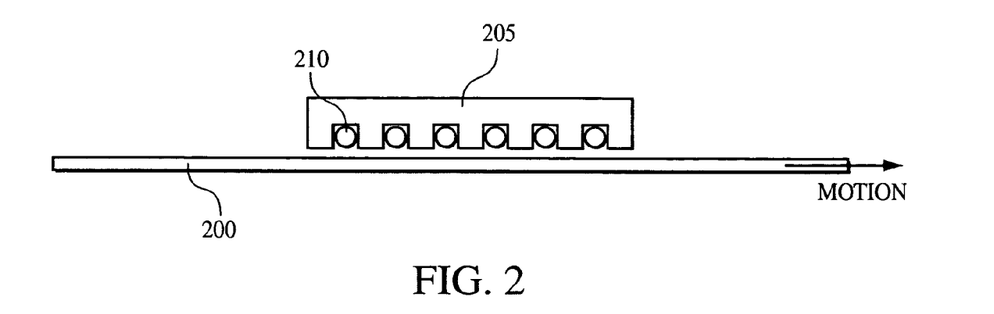
FIG. 2 shows the operation of an exemplary single-sided, short stator linear motor.

FIG. 2 shows the operating principles of an exemplary short stator design as used in the present invention. One or more thrust plates 200 (i.e., linear rotor) are used adjacent to a linear stator (of which one stator section 205 is shown) with embedded coil windings 210. By energizing the coils 210 in the shortened stator section 205 (which is smaller in length than the thrust plate 200), the thrust plate and attached elevator platform (not shown) can be imparted to move a longer distance than the length of the pictured stator section 205. If additional stator sections (not shown) are aligned adjacent to the pictured stator section 205, the system approximates a long linear stator as conventionally used in linear motor applications. However, the reduced size and compartmentalized nature of the short stator sections 205 allow gaps that are smaller than the thrust plate 200 in length to be compensated for by the system, as described below.

Figure 3:
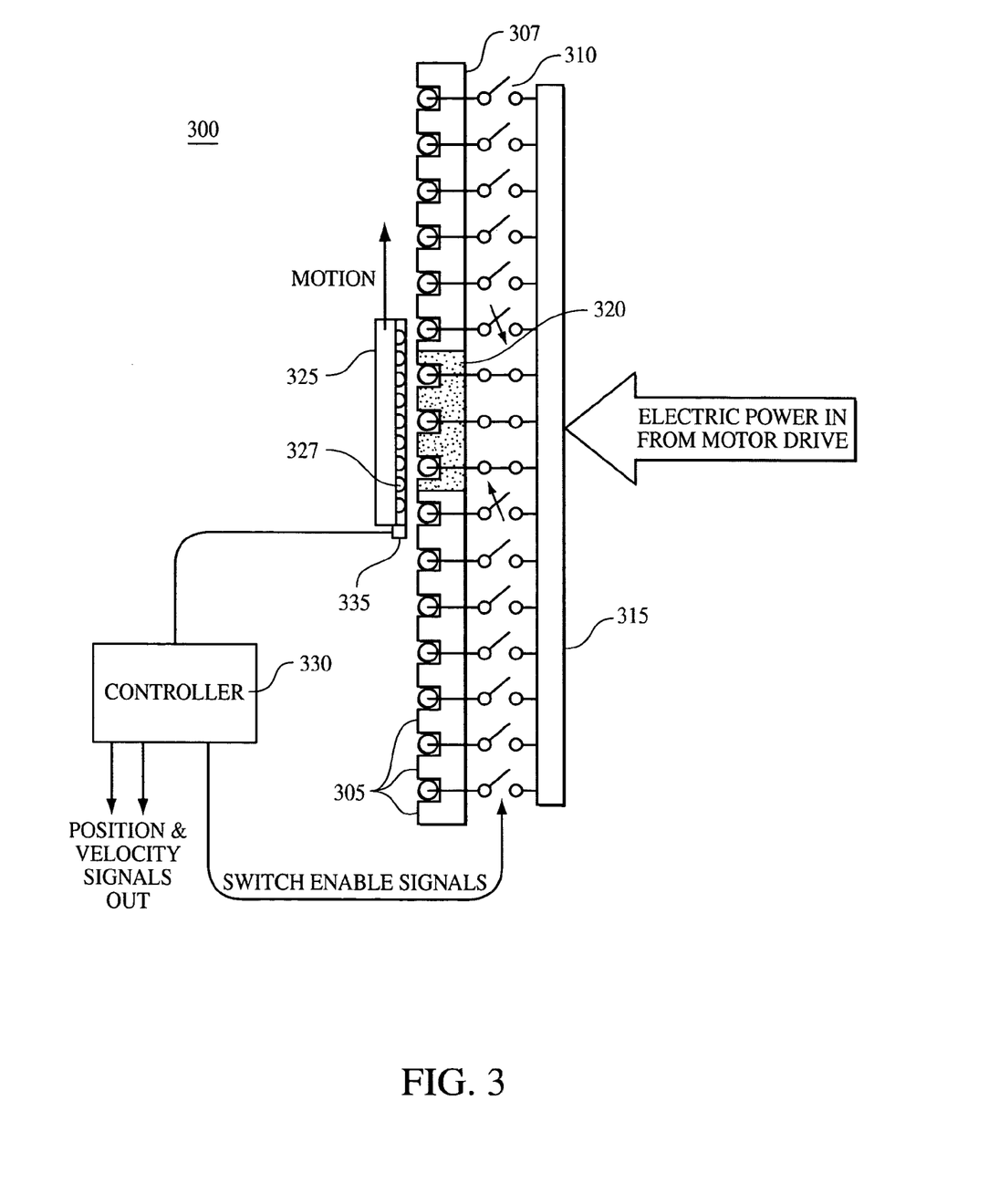
FIG. 3 depicts a side view of one embodiment of an elevator linear motor system with controller.

FIG. 3 illustrates the main features of a linear motor system 300 with a linear stator 307 made up of a plurality of aligned stator sections 305 according to the present invention. A plurality of stator section switches 310 are connected between each of the stator sections 305 and a power bus 315. Selectively closing the stator switches 310 applies power from the bus 315 to successive stator sections 305 to provide the lift force to move the thrust plate 325 and elevator platform (not shown). FIG. 3 shows an "energized" group of stator sections 320 (shown cross-hatched) that has been connected to the power bus 315 through the stator switches 310. Although no gaps in the stator are shown in FIG. 3, note that the thrust plate 325 (incorporating permanent magnets 327) attached to the elevator platform (not shown) is longer than the energized portion 320 of the linear stator 307.

A controller 330 is used to process information about the position of the elevator and to determine which individual stator sections 305 should be energized. A position sensor 335 on the elevator platform detects the instantaneous position of the elevator platform with respect to the stator sections 305. Based on this sensed position and the desired movement of the elevator, stator switch enable signals are sent from the controller 330 to the stator section switches 310 to apply appropriate power to the stator sections 305. The controller 330 may also send elevator position and velocity signals out to other shipboard systems. This compartmentalized approach to stator design and excitation allow for a reduction in power requirements (important for applications with a limited power supply) and gap flexibility as described below).

Although only a single linear stator is shown in the side view of FIG. 3, the linear motor system of the present invention preferably provides the required lift force for the elevator using multiple linear motors (i.e., stators) aligned in parallel, each separately creating a portion of the lifting force. The number and size of these linear motors may be adjusted according to the desired application, but is not a limiting factor of the present invention.

Figure 4:
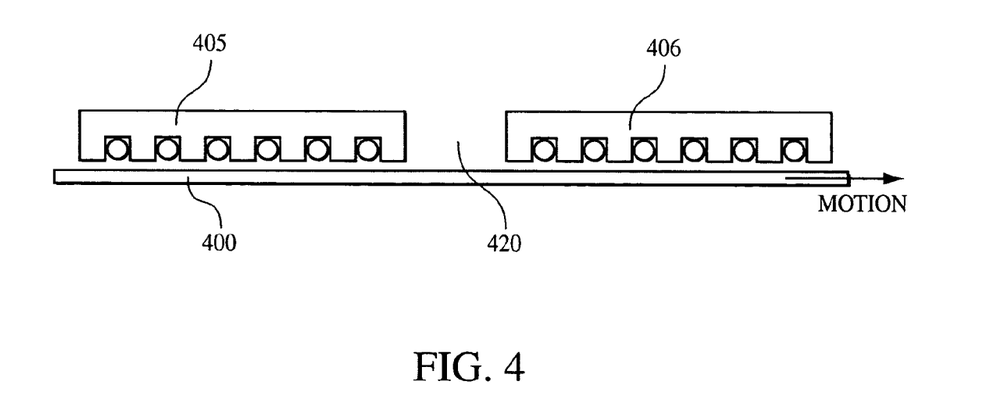
FIG. 4 shows the operation of an exemplary short stator linear motor with a gap in the stator.

FIG. 4 shows the general operating principles of the short stator linear motor of FIG. 2 with a gap 420 between two successive stator sections 405, 406. In regions with a gap 420 in the stator, e.g., for hatch closure, the motor force will be reduced. As the gap size in the stator or the payload of the elevator increases, these reduced forced regions may cause the elevator to be inoperable.

The present invention preferably compensates for gaps 420 in the stator (or between the stator sections 405, 406) by including one or more additional stator sections in or near these gap regions. In effect, the number of linear motors used in parallel at or near the gap regions will be effectively increased, and the thrust plate 400 and attached elevator will be able to bridge the gap. The elevator platform preferably incorporates additional thrust plates 400 to mate with these additional "gap" motors (stators). As shown in FIG. 4, the extended length of the thrust plate 400, which covers more than one sectioned stator 405 and the gap 420 simultaneously, is important to provide at least partial coverage of the energized stators, even in the gap regions.

Figure 5:
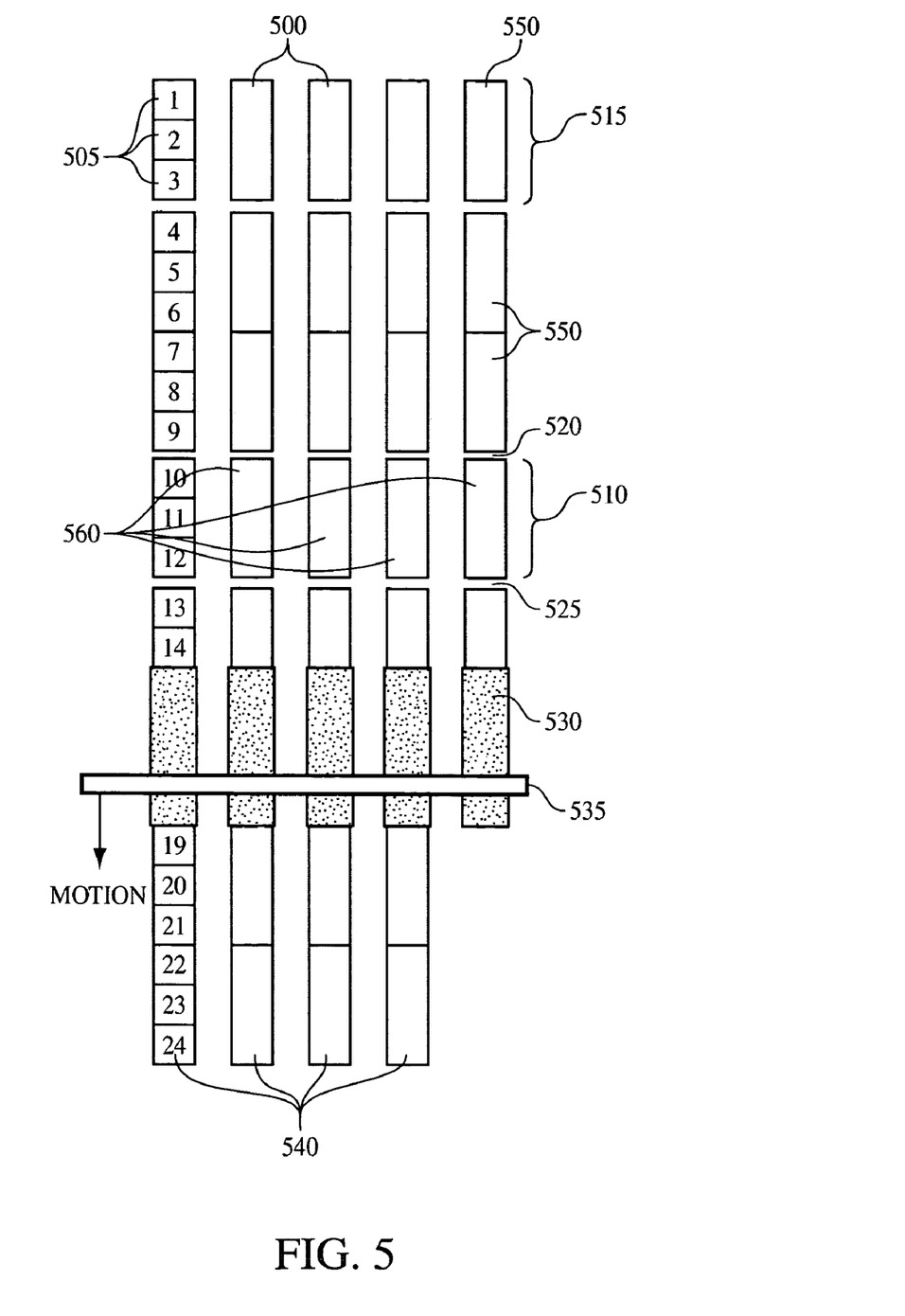
FIG. 5 illustrates a front view of an exemplary stator module arrangement as installed in an elevator shaft.

FIG. 5 is a front view (looking towards the stator) of the interior portions of a shipboard elevator system with sectioned stators. Four long linear stators 540 are shown compartmentalized into a plurality of discrete stator modules 500. Each stator module 500 is shown in FIG. 5 as being made up of three separately switched stator sections 505. Each of these stator sections 505 are individually numbered from the highest deck on the ship down, for clarity.

In this exemplary embodiment, multiple hatches exist in the depicted elevator shaft. FIG. 5 approximates an aircraft carrier weapons elevator with hatches at two locations—one at the top of the elevator shaft (generally indicated at 515) and one part of the way down the shaft (generally indicated at 510). The stators at these hatch areas are shown as being surrounded by gaps, such as the upper gap 520 and lower gap 525 surrounding the deck hatch 510. The present invention compensates for these gaps at the hatches. FIG. 6C shows a side view corresponding to this region of the FIG. 5 front view with hatch 510 and upper and lower gaps 520 and 525, respectively.

Throughout the entire length of the elevator shaft (see lower part of FIG. 5), four stators 540 (formed of a plurality of stator section modules 500) are shown in parallel running the height of the shaft. However, in areas that are adjacent to the deck hatches 510, 515, there is a gap (e.g., 520, 525) in the stator 540. Therefore, an additional "compensating" stator module 550 is included on the top and bottom of each stator gap (e.g., 520, 525) to provide the required lifting force in the vicinity of both hatches 510, 515. These additional stator sections 550 compensate for the lost thrust from the gaps in the original three linear stators 540. These compensation stator sections 550 provide adequate lift for the thrust plates 530 and attached elevator platform 535. Note that an additional thrust plate 530 is provided to mate with the compensating stator modules 550.

FIGS. 5 and 6 also demonstrate the use of stator modules on the inside lid of the deck hatches 510, 515. For example, in FIG. 5, the hatch 510 part of the way down the elevator shaft is shown as including an upper 520 and lower 525 gap with a single stator module 560 (with three sectioned stators 505 thereon) between the upper and lower gaps. In actuality, there is one large continuous gap in the linear motor 540 at the hatches, but these compensating stator modules 560 attached to the face of the deck hatch help fill in the gap. Thereby, when the deck hatch 510 is open (which must occur for elevator operation), the compensating stator modules 560 are aligned (with small gaps above 520 and below 525) with the rest of the existing linear stator (540).

Figure 6A:
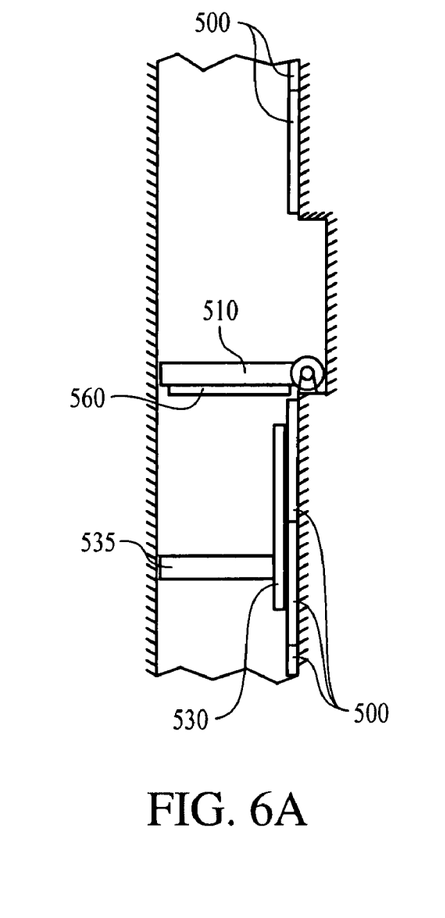
Figure 6B:
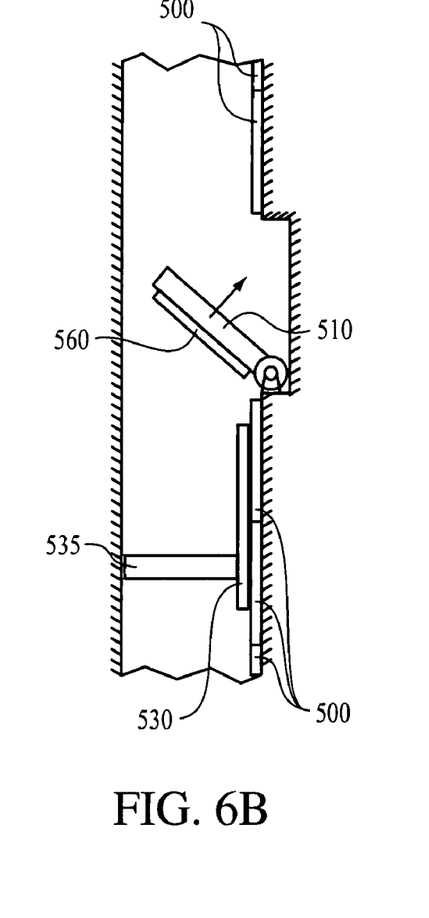
Figure 6C:
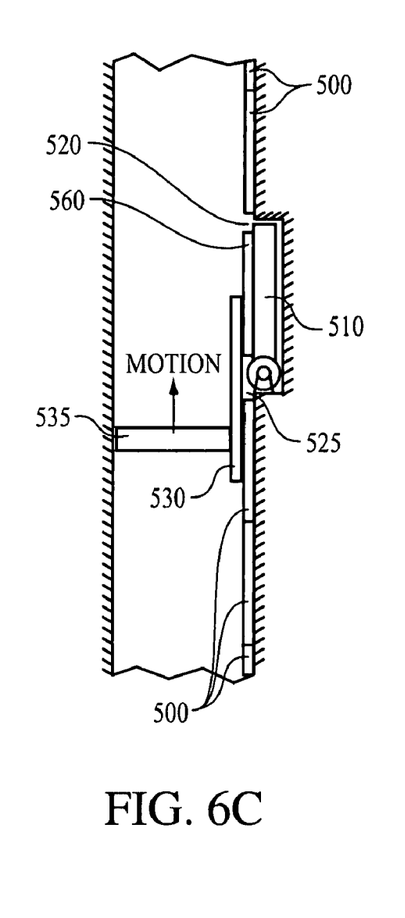

FIG. 6 shows the hatch-based compensation stator module 560 in more detail. In FIG. 6A, the deck hatch 510 is shown in its closed (normal) operating position. Here, the thrust plate 530 on the elevator platform 535 is mated to two successive stator modules 500 affixed to the wall of the elevator shaft below the closed hatch. In FIG. 6B, as the hatch 510 is being opened, the compensating stator module 560 on the face of the hatch begins to be aligned with the other stator modules 500 affixed to the walls of the elevator shaft.

Finally, FIG. 6C shows the deck hatch 510 in its fully-opened position. When open, the compensating stator module 560 is now aligned with the other stator modules 500 on the walls of the elevator shaft (with small gaps above 520 and below 525 the compensating stator module as in FIG. 5). The elevator platform 535 is now able to progress up the shaft past the open hatch 510 utilizing the compensation stator modules 560 on the face of the hatch and above and below the gaps in the linear stator. Note that the thrust plate 530 is longer than the gap in the stator over which it travels.

A modular stator segment such as that used in the present invention is designed to simplify logistics and repair. Each module preferably incorporates the stator section switches for energizing the appropriate sections in a single package. A typical module 500, as shown diagrammatically in FIG. 5, includes three stator section switches. Each stator section switch energizes all three phases in a stator electrical section. A complete stator is formed by installing modules end-to-end along the elevator shaft. Modules are spaced apart accordingly at the gaps for hatch closing.

Figure 7:
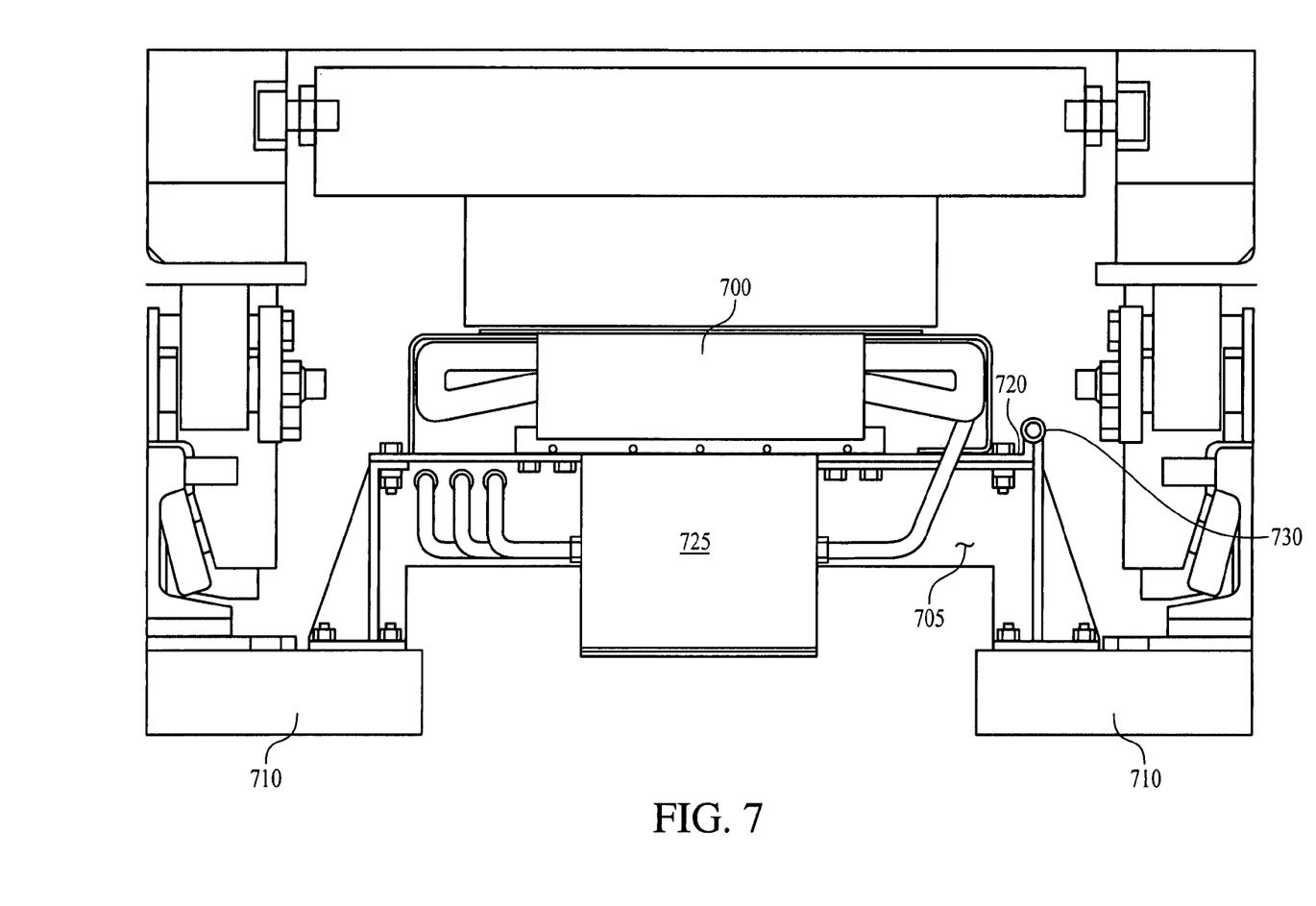
FIG. 7 illustrates a top view of an exemplary linear motor system installed in an elevator shaft.

An exemplary stator module is mounted to the wall of the elevator shaft as shown in FIG. 7. When viewed from the elevator shaft down, the stator and its support occupy the area between the guide rails but only a stator cover and frame may be visible.

The motor stator section 700 and its support frame 705 are preferably supported off of the guide rail supports 710 (see FIG. 7). The motor stator section 700 is mounted to the motor support plate 720, which is in turn supported off of a frame attached to the guide rail support 710. The stator section switch elements 725 and the power cabling are mounted behind the motor stator section 700 on the backside of the motor support plate. The motor support plate 720 is bolted to the support frame 705 but also loosely hinged to the frame via a motor support plate hinge 730. When the bolts holding the motor support plate 720 to the frame are removed, the plate swings away from the support frame 705 allowing access from the elevator shaft to the components on the back of the motor, particularly the stator section switches 725. The stator section switch enclosure is removable as a unit, and can be maintained as a unit or the control area can be opened for control board replacement without removal of the switch enclosure.

For this application, stator modules may be water cooled via tubes on the back of the stator core. The 3-phase switching elements are also attached to the stator frame and take advantage of the water cooling. Air cooled modules are also possible. For air cooled modules, the modules would incorporate required heat sinks and cooling fans.

Alternative Horizontal Embodiment

Other onboard applications, for example on aircraft carriers, require the movement of large masses horizontally. One exemplary application involves the horizontal movement of large hangar doors that may weigh many tons. Traditionally, some type of rolling mechanism is used to enable door access. However, the linear motor of the present invention may be turned on its side and adapted to reduce the gravitational effects (and hence rolling friction) of such large doors.

Taking the hangar bay doors example in more detail, the conventional drive system for these doors includes an arrangement of wire cables connected to cable drums on conventional electric motors that pull the door panels open and closed. The wire cables travel through numerous pulleys and sheaves between the drive motor and the connection to the door. These cables may foul causing the doors to become stuck open, closed, or in an intermediate position. Significant down time exists to realign the cables and make the doors operational again after such an incident.

The hangar doors also travel in a track recessed into the deck floor. The recess in the floor collects debris, grit, and oily dirt. Keeping the guide track clean is difficult and time consuming. Again, when the track becomes fouled with dirt and debris, the lower rollers tend to become fouled as well, causing the doors to drag and become stuck during operation. In addition, the door systems exhibit a high component failure rate due to the numerous couplings, gears, pulleys, cables, and locking devices.

Figure 8:
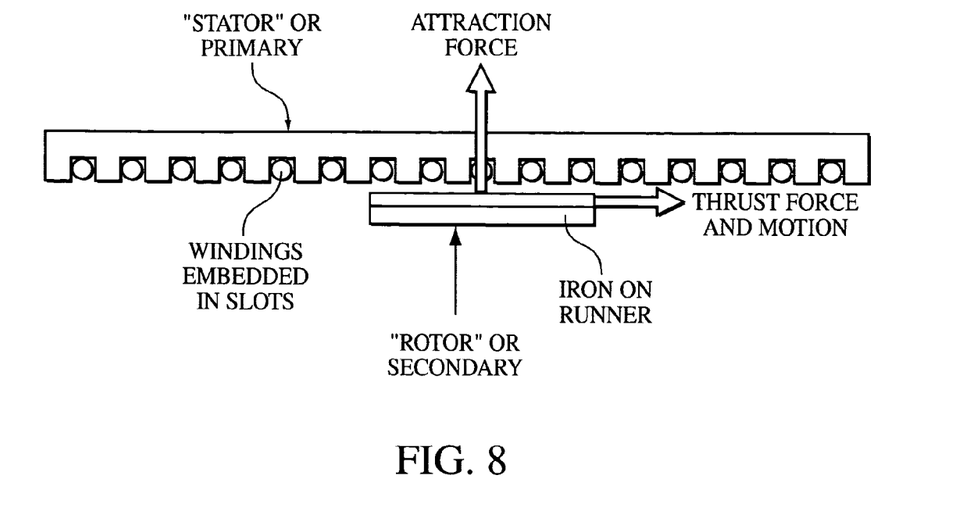
FIG. 8 illustrates the forces on a linear motor oriented horizontally.

The force effects of the single-sided linear motor technology of the present invention are shown in FIG. 8. In such a motor, the moving rotor or runner (i.e., thrust plate) often contains iron to form a return path for the magnetic field generated by the stator. When utilized for low speed applications (such as hanging door opening), single-sided linear motors with iron in the rotor generate significant normal attraction forces between the stator and the rotor. These attraction forces are of the same order of magnitude as the thrust force that moves the runner plate.

This aspect of the present invention takes advantage of the normal attraction force between the stator and the runner to lift the hanging door while the thrust force moves the door horizontally. The lifting force counteracts, at least to some extent, the considerable weight of the hanging door. This in turn reduces the weight on the rollers at the bottom of the door enabling them to roll more freely and stick less often. If the linear motor is large enough, the lifting force could levitate the door a small distance above the deck floor, eliminating the need for rollers on the bottom of the door at all.

Figure 9:
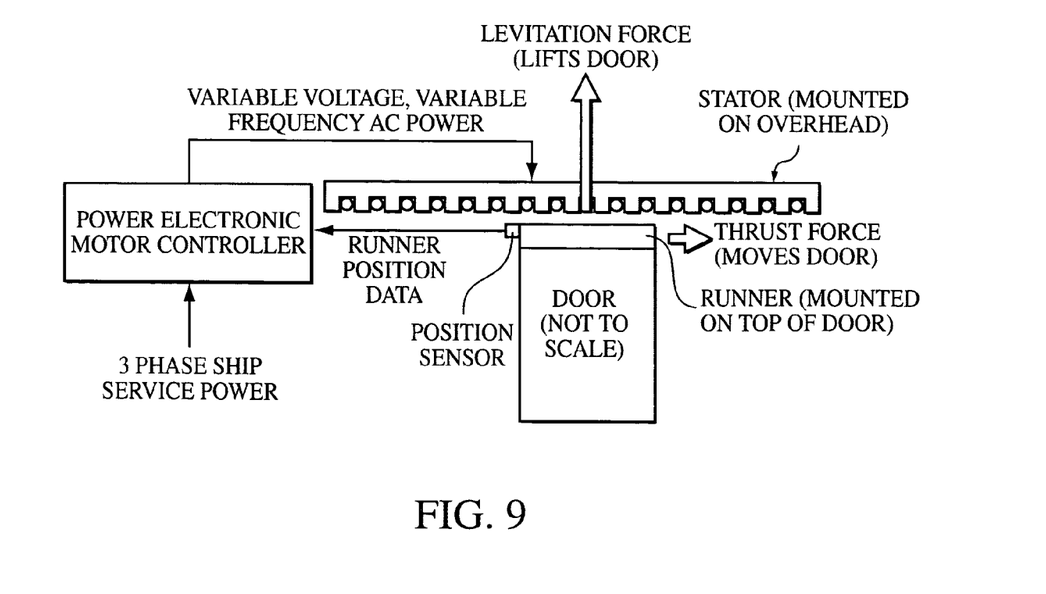
FIG. 9 illustrates an exemplary hanging door drive system utilizing a horizontal linear motor.

FIG. 9 shows a typical door drive system using the single-sided linear motor technology of the present invention. The stator is mounted on the ceiling above the door. The moving runner plate (i.e., thrust plate) is mounted on the top of the door. A power electronic motor controller provides variable voltage, variable frequency AC power to the stator to control door motion. When the motor is energized, the inherent attraction force provides a lifting force to oppose the weight of door and the thrust force moves the door. For an induction machine, the runner can be a conducting plate with back iron, or a structure with conducting bars in slots (linear squirrel cage). For a synchronous machine, the runner can include permanent magnets with back iron. A wound-field runner is also possible. In FIG. 9, the control system uses runner position data and a control algorithm such as vector control to provide precise speed and positioning of the door. Sensor-less control schemes could also be applied to the application.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A linear motor elevator system, comprising:
   at least one linear stator comprised of individually-energized stator sections, said linear stator including a gap;
   at least one thrust plate oriented adjacent to said stator;
   an elevator platform attached to said thrust plate; and
   at least one compensation stator section located adjacent to said gap in said linear stator and in parallel with said linear stator, wherein said thrust plate is longer than said gap.

2. The motor system of claim 1, wherein said individually-energized stator sections are grouped into replaceable stator modules.

3. The motor system of claim 1, further comprising:
   a controller that determines which of said stator sections is to be energized at any instant.

4. The motor system of claim 1, further comprising:
   a second linear stator in parallel with said first linear stator and also being comprised of individually-energized stator sections.

5. The motor system of claim 4, further comprising:
   a second thrust plate connected to said platform and adjacent to said second linear stator.

6. The motor system of claim 1, further comprising:
   a hatch compensation stator oriented in parallel with said linear stator and disposed in said gap.

7. The motor system of claim 3, further comprising:
   a position sensor attached to said platform and in communicative contact with said controller.

8. The motor system of claim 1, wherein said thrust plate includes permanent magnets.

9. The motor system of claim 1, wherein said thrust plate includes a slotted iron core and copper or aluminum bars.

10. The motor system of claim 1, wherein said thrust plate includes a smooth copper or aluminum plate backed by iron.

11. A linear motor drive system for moving large doors, comprising:
    at least one linear stator comprised of individually-energized stator sections, said linear stator including a gap;
    at least one thrust plate adjacent to said stator, said stator and thrust plate oriented so that an attraction force between the stator and the thrust plate is vertically upward;
    a door panel attached on the bottom of said thrust plate; and
    at least one compensation stator section located adjacent to said gap in said linear stator and in parallel with said linear stator, wherein said thrust plate is longer than said gap.

12. The motor system of claim 11, wherein said individually-energized stator sections are grouped into replaceable stator modules.

13. The motor system of claim 11, further comprising:
    a controller that determines which of said stator sections is to be energized at any instant.

14. The motor system of claim 11, further comprising:
    a second linear stator in parallel with said first linear stator and also being comprised of individually-energized stator sections.

15. The motor system of claim 14, further comprising:
    a second thrust plate connected to said door and adjacent to said second linear stator.

16. The motor system of claim 13, further comprising:
    a position sensor attached to said door and in communicative contact with said controller.

17. The motor system of claim 11, wherein said thrust plate includes permanent magnets.

18. The motor system of claim 11, wherein said thrust plate includes a slotted iron core and copper or aluminum bars.

19. The motor system of claim 11, wherein said thrust plate includes a smooth copper or aluminum plate backed by iron.

20. The motor system of claim 11, wherein said door has rollers attached on a side of said door opposite said thrust plate.

* * * * *